(12) United States Patent
Lee, Jr.

(10) Patent No.: US 7,968,760 B2
(45) Date of Patent: *Jun. 28, 2011

(54) TREATMENT OF PARTICULATE BIODEGRADABLE ORGANIC WASTE BY THERMAL HYDROLYSIS USING CONDENSATE RECYCLE

(75) Inventor: John W Lee, Jr., Bellevue, WA (US)

(73) Assignee: CH2M Hill, Inc., Englewood, CO (US)

( * ) Notice: Subject to any disclaimer, the term of this patent is extended or adjusted under 35 U.S.C. 154(b) by 420 days.

This patent is subject to a terminal disclaimer.

(21) Appl. No.: 12/048,423

(22) Filed: Mar. 14, 2008

(65) Prior Publication Data

US 2008/0223793 A1 Sep. 18, 2008

Related U.S. Application Data

(60) Provisional application No. 60/895,194, filed on Mar. 16, 2007.

(51) Int. Cl.
    A62D 3/20 (2007.01)
(52) U.S. Cl. .................. 588/312; 588/318; 588/405
(58) Field of Classification Search .................. None
    See application file for complete search history.

(56) References Cited

U.S. PATENT DOCUMENTS

| | | | |
|---|---|---|---|
| 3,711,392 A | 1/1973 | Metzger | |
| 3,933,628 A | 1/1976 | Varani | |
| 3,959,125 A | 5/1976 | Teletzke | |
| 3,972,693 A * | 8/1976 | Wiesner et al. | 95/158 |
| 4,022,665 A | 5/1977 | Ghosh et al. | |
| 4,318,993 A | 3/1982 | Ghosh et al. | |
| 4,551,250 A | 11/1985 | Morper | |
| 4,597,872 A | 7/1986 | Andersson et al. | |
| 4,652,374 A | 3/1987 | Cohen | |
| 4,765,900 A | 8/1988 | Schwoyer et al. | |
| 4,846,964 A | 7/1989 | Scott | |
| 4,861,519 A | 8/1989 | Tusa et al. | |
| 4,975,106 A | 12/1990 | Ferguson | |
| 5,057,220 A | 10/1991 | Harada | |
| 5,120,448 A | 6/1992 | Dorica | |
| 5,169,532 A | 12/1992 | Whitlock | |
| 5,266,201 A | 11/1993 | Letourneux | |
| 5,269,947 A | 12/1993 | Baskis | |
| 5,279,637 A | 1/1994 | Lynam et al. | |
| 5,360,553 A | 11/1994 | Baskis | |
| 5,366,558 A | 11/1994 | Brink | |
| 5,377,917 A | 1/1995 | Wiljan et al. | |
| 5,393,428 A | 2/1995 | Dilla et al. | |
| 5,407,817 A | 4/1995 | Lightsey | |
| 5,431,819 A | 7/1995 | Hack et al. | |
| 5,525,229 A | 6/1996 | Shih | |
| 5,529,692 A | 6/1996 | Kubler | |
| 5,543,061 A | 8/1996 | Baskis | |
| 5,707,417 A | 1/1998 | Yokoyama et al. | |
| 5,766,440 A | 6/1998 | Ino et al. | |
| 5,773,526 A | 6/1998 | Van Dijk et al. | |
| 5,795,479 A * | 8/1998 | Vogt et al. | 210/603 |
| 5,888,307 A | 3/1999 | Solheim | |
| 6,036,748 A * | 3/2000 | Wallace et al. | 95/257 |
| 6,117,672 A * | 9/2000 | Breckenridge | 435/266 |
| 6,296,766 B1 | 10/2001 | Breckenridge | |
| 6,342,378 B1 | 1/2002 | Zhang | |
| 6,387,221 B1 | 5/2002 | Schoenhard | |
| 6,464,875 B1 | 10/2002 | Woodruff | |
| 2002/0162332 A1 * | 11/2002 | Hazlebeck | 60/775 |

FOREIGN PATENT DOCUMENTS

| | | |
|---|---|---|
| DE | 199 37 876 A1 | 3/2001 |
| EP | 0 335 825 A1 | 10/1989 |
| JP | 4-326998 A | 11/1992 |
| JP | 10-192889 A | 7/1998 |
| JP | 10-235315 A | 9/1998 |
| WO | WO 88/04282 | 6/1988 |
| WO | WO 2004/108609 | 12/2004 |
| WO | 2006039354 * | 4/2006 |

OTHER PUBLICATIONS

Davis & Cornwell (1991) Introduction to Environmental Engineering 2nd Edition, McGraw-Hill, Inc., pp. 393-396.
Garvie (1992) TAPPI Proceedings 1992 Environmental Conference, pp. 681-685, Anaerobic/Aerobic Treatment of NSSC/CTMP Effluent and Biotags Utilization.
Lee (2000) Industrial Environmental Control Pulp and Paper Industry 3rd Edition, Edited by Allan M. Springer, TAPPI Press, pp. 369-416.
Lemley (2003) Discover.com 24:51-57.
Smith (1994) TAPPI Proceedings 1994 International Environmental Conference, pp. 153-156.

* cited by examiner

Primary Examiner — Melvin C Mayes
Assistant Examiner — Sheng H Davis
(74) Attorney, Agent, or Firm — Dorsey & Whitney LLP

(57) ABSTRACT

A method of treating particulate biodegradable organic waste by thermal hydrolysis. The method includes subjecting a quantity of the particulate biodegradable waste to thermal hydrolysis at a temperature above about 130° C. and a pressure at or above the saturated water vapor pressure to produce a slurry. The slurry will include solubilized organic material and unhydrolyzed residual solids. The method further includes decreasing the pressure at which the slurry is maintained. Typically, the step of decreasing slurry pressure will occur in a flash tank, which allows the separation of an organic acid-rich steam from other hydrolysis products. The method further includes capturing the steam or other condensable gases released when pressure is decreased and condensing the steam or other condensable gases into a condensate. The captured condensate may then be added to a quantity of particulate biodegradable waste prior to thermal hydrolysis. Also disclosed is an apparatus for practicing the method described above.

9 Claims, 11 Drawing Sheets

TREATMENT OF PARTICULATE BIODEGRADABLE ORGANIC WASTE BY THERMAL HYDROLYSIS USING CONDENSATE RECYCLE

TECHNICAL FIELD

A method and apparatus for the treatment of particulate biodegradable organic waste, and more particularly a method and apparatus for the thermal hydrolysis and anaerobic treatment of particulate biodegradable organic waste which method includes condensate recycling.

BACKGROUND

A number of countries in Asia and in Europe currently require or are expected to require biodegradable solid waste and food waste solids from residences, as well as restaurants and institutions that prepare and serve food, to be source segregated from metal, glass, plastics, paper, and other solid waste materials. This regulatory trend is likely to be adopted by larger cities in both the United States and Canada. Currently, disposal of food waste-solids in these countries is by landfill, incineration and to a limited degree composting to produce soil amendment.

South Korea is one representative country seeking to restrict disposal of food waste and biodegradable solid waste. The Korean national government has indicated it intends to prohibit landfill disposal of food wastes by Jan. 1, 2006. Food wastes are composed primarily of vegetables, fruits, grains, and meat/fish products that contain fiber, carbohydrate, fat, protein and inorganic ash. Data indicates that Korean source segregated food wastes contain 76-84% moisture and 16-24% dry matter. Additionally, the dry matter is 80-90% volatile. Incineration is a costly alternative, skeptically viewed by the Korean public because of environmental concerns.

Regulatory requirements are becoming increasingly more stringent for land disposal of wastewater treatment biosolids and animal manures in North America, Europe, and Pacific Rim countries. South Korea currently disposes of wastewater treatment biosolids and animal manures by ocean dumping, but has agreed with the international community to cease this practice beginning in 2008.

As an alternative to conventional landfill or incineration disposal, particulate food wastes, wastewater treatment biosolids, animal manures, and other biodegradable organic particulate matter (i.e. green wastes, source separated biodegradable municipal solid waste, etc.) can be first solubilized by thermal hydrolysis, with the liquid fraction converted, under suitable anaerobic conditions to methane gas and carbon dioxide. The residual carbonaceous material containing nitrogen and phosphorus is suitable for use as a soil amendment or as a fertilizer with further nitrogen and phosphorus fortification. Alternatively, the residual carbonaceous material has sufficient caloric value (10,000-12,500 Btu per pound of volatile dry solids) so as to be suitable for use as a source of fuel to generate energy.

Thus, thermal hydrolysis of particulate biodegradable organic wastes followed by anaerobic conversion of the solubilized fraction and combustion of the unhydrolyzed residue product of these organic solid wastes potentially provides an economically attractive and environmentally sustainable disposal alternative offering significant benefits.

Yokoyama, U.S. Pat. No. 5,707,417, is directed to a method for treating garbage including thermal hydrolysis followed by anaerobic digestion. More particularly, Yokoyama is concerned with the treatment of garbage resulting from the preparation, cooking and dispensing of food containing water-insoluble organic compounds. Yokoyama teaches thermal hydrolysis of food waste for periods of 1-720 minutes at temperatures between 100-400° C. (212-752° F.) and at pressures higher than the corresponding water vapor saturation pressure (2-200 atm or 29.4-2940 psig). Following solubilization, the solubilized organics and insoluble particulates are anaerobically digested to produce methane. Yokoyama further teaches that the soluble and insoluble products from thermal hydrolysis may be separated before subjecting the liquid phases to anaerobic digestion. Yokoyama then teaches that the solid phases can be recovered and burned or processed into compost. While Yokoyama provides considerable benefit over conventional landfill or incineration disposal of food wastes, the process taught by Yokoyama is not energy efficient, nor does it maximize solubilization or liquid removal from residual solid phases. Further, Yokoyama does not minimize the soluble fraction recalcitrant to biodegradation or ammonia produced from thermal hydrolysis.

Solheim, U.S. Pat. No. 5,888,307, teaches a continuous multi-stage system consisting of four steam reaction vessels operated in series to solubilize organic waste materials, including sewage sludge. Solheim teaches that to minimize heating costs and to conserve energy, flash steam from the fourth stage reaction vessel can be combined with supplemental steam to heat the first stage reaction vessel. In addition, flash steam from the third stage reaction vessel can be used to heat the second stage reaction vessel. Solheim teaches the hydrolysis occurs in a temperature range of 160-240° C. (320-464° F.). Solheim further teaches that acid can be added in order to obtain enhanced hydrolysis. Solheim fails to optimize energy usage in the hydrolysis process. Furthermore, Solheim does not teach any benefit in separating solubilized organics and residual solids before anaerobic digestion.

Shih, U.S. Pat. No. 5,525,229, teaches an apparatus and method for anaerobic digestion of organic materials such as sewage sludge, municipal waste, animal waste and other highly organic materials. Shih discloses bacterial hydrolysis of such waste prior to anaerobic digestion to enhance soluble organics available for anaerobic digestion. Shih also teaches recycling heat from the digestion process to preheat materials being added to the hydrolysis step. The bacterial hydrolysis step taught by Shih fails to provide sufficient solubilization and solids dewatering potential to minimize the volume of residual solids. It, therefore, is not fully effective at minimizing the volume of solid wastes which must be disposed of.

Lee, U.S. Pat. No. 6,905,600 teaches a method and apparatus for the treatment of particulate biodegradable organic waste, which may be utilized as the basis for the improved method and apparatus disclosed herein. Lee features the treatment of solubilized organic material and unhydrolyzed residual solids in a steam flash tank among other elements. According to Lee, the steam collected from the flash tank may be recovered for use as a heat source by routing the steam to heat exchangers associated with a presteaming bin. The disclosure of Lee, however, recognizes no use for steam or condensate recovered from the steam flash tank other than use as a heat source. Other beneficial properties of the steam condensate are not recognized or exploited.

The present invention is intended for overcoming one or more of the problems discussed above.

SUMMARY

One embodiment disclosed herein is a method of treating particulate biodegradable organic waste by thermal hydrolysis. The method includes subjecting a quantity of the particulate biodegradable waste to thermal hydrolysis at a temperature above about 130° C. and a pressure at or above the saturated water vapor pressure to produce a slurry. The slurry will include solubilized organic material and unhydrolyzed residual solids. The method further includes decreasing the pressure at which the slurry is maintained. Typically, the step of decreasing slurry pressure will occur in a flash tank, which allows the separation of an organic acid-rich steam from other hydrolysis products. The method further includes capturing the steam or other condensable gases released when pressure is decreased and condensing the steam or other condensable gases into a condensate. The captured condensate may then be added to a quantity of particulate biodegradable waste prior to thermal hydrolysis.

The captured condensate is typically rich in organic acids and will have a pH substantially lower than the particular biodegradable organic waste, which is to be input into the thermal hydrolysis process. Hydrolysis has been found to proceed more efficiently under acidic conditions. Thus, recycling the acidic condensate to the input of the particulate biodegradable organic waste prior to hydrolysis will increase the efficiency and effectiveness of the hydrolysis process. In addition to a low pH, there may be other properties intrinsic to organic acid that facilitate the efficiency and effectiveness of the hydrolysis process and may facilitate dewatering as well.

The method may be implemented in a continuously operated hydrolysis system where condensate captured in the downstream portion of a continuous process may be continuously be added to particulate biodegradable organic waste being added in upstream portions of the process. Alternatively, the method may be implemented in a batch process where earlier captured condensate is added to subsequently added particulate biodegradable organic waste. In any case, the pH of the biodegradable organic waste may be adjusted as necessary by addition of captured condensate to provide an input pH which is most effective for thermal hydrolysis. In addition, the organic acid content of the recycled condensate may be further concentrated by distillation, steam stripping, molecular sieve, or other concentration methods or fortified with the addition of formic, acetic, and/or other organic acids to optimize the input pH to most effectively promote volatile solids solubilization.

Also disclosed is an apparatus for treating particulate biodegradable organic waste. The apparatus includes a thermal-hydrolysis reactor suitable for the hydrolysis of particulate biodegradable organic waste. Thermalhydrolysis typically takes place at a temperature above about 130° C. and a pressure at or above the saturated water vapor pressure to produce a slurry. The apparatus also includes a steam flash tank for receiving the slurry from the thermalhydrolysis reactor where pressure may be released over the slurry. Pressure release causes the formation of steam enriched with organic acids and other hydrolysis products. The apparatus further includes a condenser receiving steam from the steam flash tank. In the condenser, steam may be condensed and recycled through a recycling system in communication with both the condenser and an input to the thermalhydrolysis reactor. The recycling system may be a conduit connecting the condenser to an input located at the thermalhydrolysis reactor or another input apparatus upstream of the thermalhydrolysis reactor. Alternatively, the recycling system may include a storage tank or other apparatus suitable for storing condensate for subsequent addition to particulate biodegradable organic waste prior to hydrolysis. A supply of formic, acetic and/or other organic acids may be in communication with the thermal hydrolysis reactor to adjust a pH in the hydrolysis reactor to optimize volatile solids solubility and/or dewatering of residual solids. In addition, a distillation, steam stripping, molecular sieve or other concentration apparatus can be provided in communication with the recirculation system to concentrate the organic acid in the condensate.

While the application expressly discloses providing heat for the hydrolysis by steam injection, various forms of indirectly heating the hydrolysis reactor, for example using hot oil or electricity, may be substituted.

DETAILED DESCRIPTION

The primary objective of using thermal hydrolysis to treat particulate biodegradable organic waste is volume reduction. This is accomplished by heating particulate organic material to temperatures above 130° C. and preferably at or above 170° C. for a specified period of time-at-temperature. These temperature conditions cause the cell tissue of volatile particulate organic material to hydrolyze and rupture, releasing soluble material inside the cell walls. As shown in Table 1 below and graph 100 of FIG. 1, the degree of particulate organic matter solubilization increases with time-at-temperature.

Figure 2A:
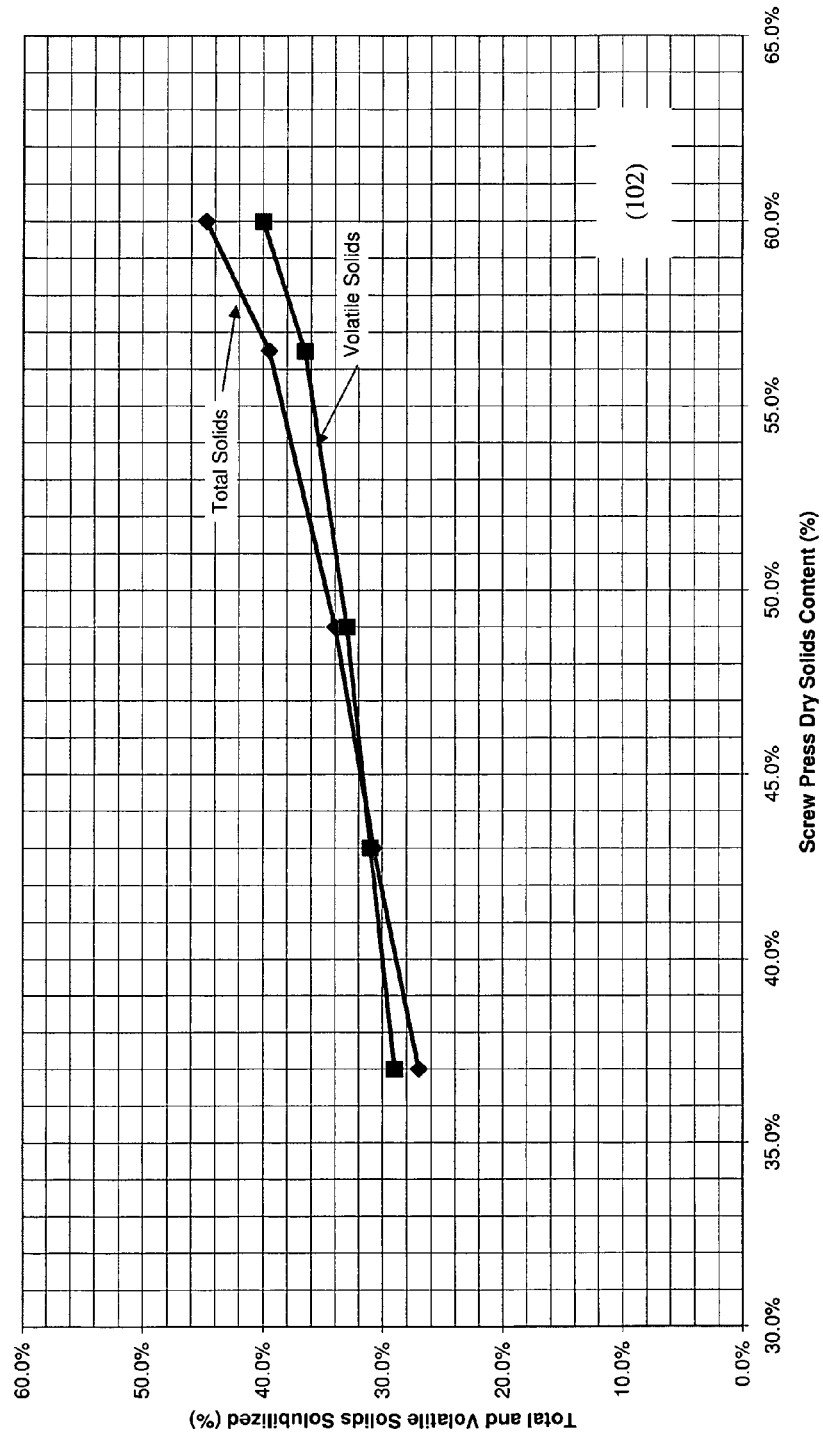
FIGS. 2A-2G are graphic representations of the results of preliminary, and secondary testing and tertiary testing of the thermal hydrolysis of biosolids with and without condensate recycling.

In addition to the volume reduction that results from the solubilization of particulate organic material, bench scale treatability work indicates that the dewaterability of the unhydrolyzed residue improves substantially, as the fraction of total and volatile solids that are solubilized increases (see Table 1 and graph 102 of FIG. 2A). This improvement in dewaterability can be a larger contributor to overall volume reduction than solubilization of particulate organics.

Bench scale treatability work also indicates that the fraction of volatile solids that are hydrolyzed and improvement in residuals dewaterability depends on several factors.

1) The source and composition of the particulate organic waste (i.e. raw wastewater treatment biosolids, institutional and household food waste, animal manures, food processing waste, etc.) For example, bench scale treatability work indicates that 50 to 70+% of the volatile solids in institutional and household food waste can be solubilized, compared to 20 to 40% of the volatile fraction of municipal wastewater treatment combined raw primary and secondary biosolids at similar operating conditions.

2) Reactor Operating Temperature

Figure 2B:
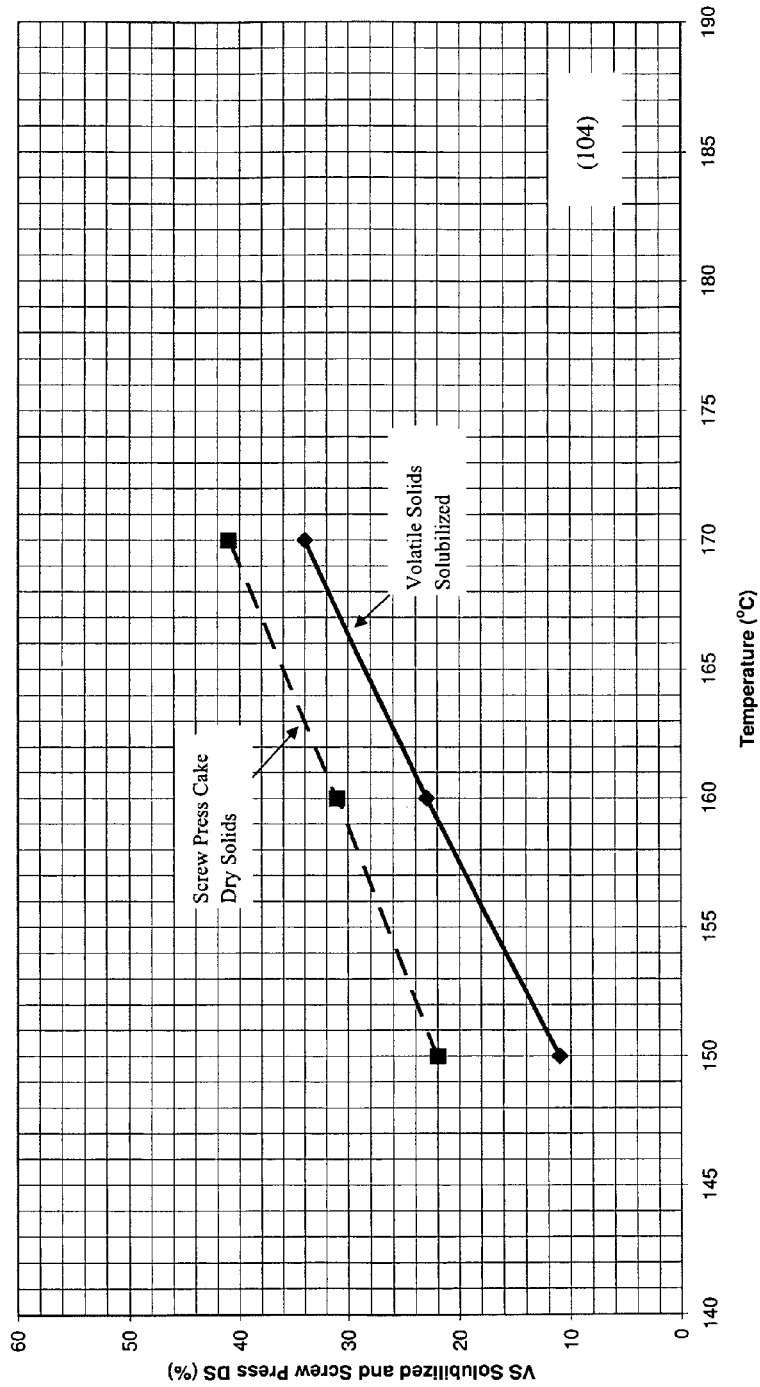

Bench scale treatability work indicates that the rate of solubilization of particulate volatile organic solids increases as reactor temperatures increase between 150-170° C. at the same time-at-temperature operation condition (see Table 2 and Graph 104 of FIG. 2B). The rate and degree of solubilization are expected to continue to increase at temperatures above 170° C.

3) Reactor Time-at-temperature

Figure 1:
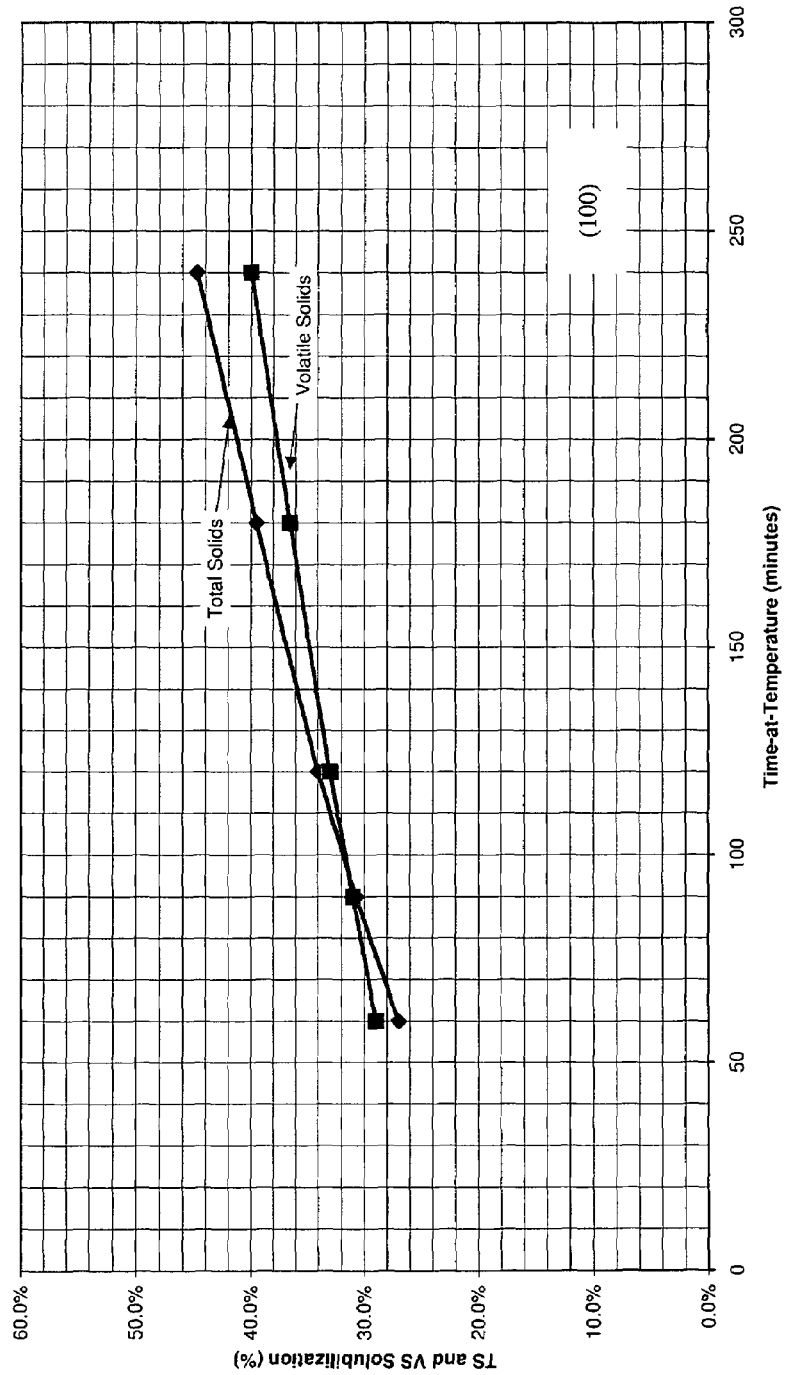
FIG. 1 is a graph of solubilization as a function of Time at Temperature.
Figure 2C:
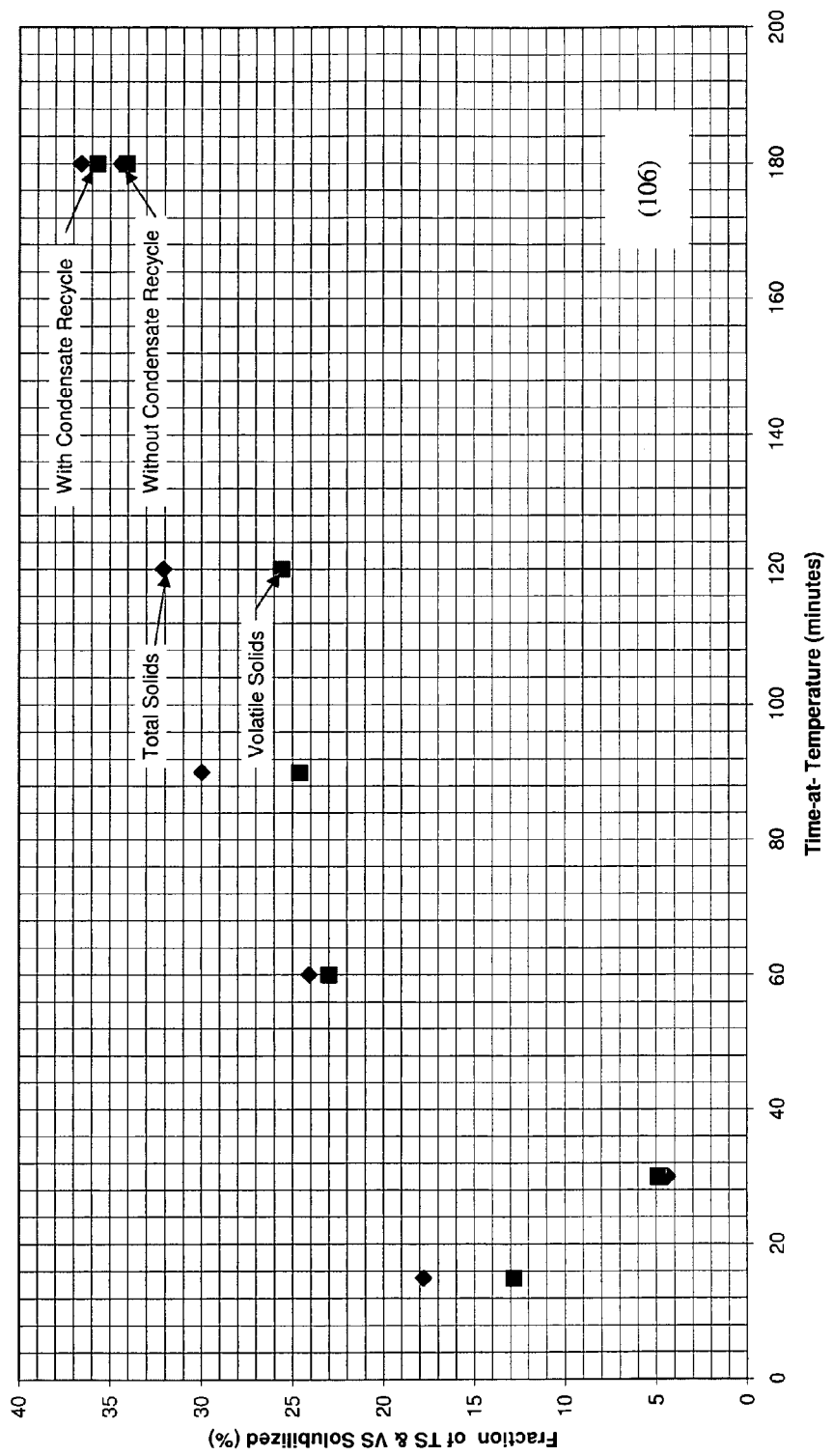

Bench scale testing also indicates that solubilization of particulate volatile organic solids and dewaterability of the residue after thermal hydrolysis increases with time-at-temperature at a constant operating temperature (see Table 1 and FIGS. 1 and 2C)

4) Reactor Acidic Conditions

Bench scale treatability studies further indicate that thermal hydrolysis of the particulate organic wastes evaluated occurs in an acidic environment at pH conditions typically at or below about pH 5.2 with operating conditions of 170° C. and time-at-temperature of about 30 minutes or longer (see Table 3, Table 4, Table 5 and graphs 106, 108, 110, 112, 114, of FIGS. 2C, 2D 2F and 2G, respectively)

This acidic condition is due to the presence of organic acids released and/or formed during thermal hydrolysis (see Table 6 and Table 7 for a chart of condensate composition) and reduces the time-at-temperature necessary to solubilize particulate organic volatile solids compared to neutral pH conditions. The increased rate of solubilization may not only be due to a lowering of the pH resulting in acid hydrolysis, but may also be associated with intrinsic properties of the organic acids in the condensate.

Bench scale treatability studies have also demonstrated that acid pH conditions coupled with reactor temperature about 170° C. cause inorganic residue to mineralize, improving dewatering (see FIG. 1). The degree of particulate organics mineralization increases with time-at-temperature and can be greater than the extent to which volatile solids are solubilized. The net effect is to further reduce the mass and volume of residue remaining as time-at-temperature increases.

As shown in Table 6 and Table 7, thermal hydrolysis of particulate organic material initially solubilizes low molecular weight extractives, including a spectrum of organic acids, including formic, acetic, propionic, and butyric acid. Particulate organic wastes, including institutional and household food wastes, raw biosolids, hog manure, and food processing wastes, tend to be acidic when received for processing as a result of organic acids produced by natural fermentation during collection and transport. Organic acids are also produced when volatile solids are solubilized by thermal hydrolysis. The net effect of the organic acids present in the feedstock and produced by thermal hydrolysis is to accelerate the rate of particulate organics solubilization and improved dewaterability of the residue.

A significant portion of the organic acids formed during thermohydrolysis are contained in the condensate formed when pressure is rapidly released during the flashing of a hydrolysis product in a blow tank. In prior art hydrolysis implementations such as that taught by Lee, U.S. Pat. No. 6,905,600, which patent is incorporated herein by reference in its entirety, heat from the steam was exchanged to preheat organic material prior to a hydrolysis reactor. In prior hydrolysis implementations, the other properties of the steam or condensate recovered from a blow tank were ignored. The pH of the condensate is typically 0.5 to >1.2 pH units lower than the hydrolysis liquor as shown on FIG. 3. The apparatus and method disclosed herein feature recycling condensate to blend with the feed to the hydrolysis reactor which increases the organic acid content of the feed stock. This lowers the pH in the hydrolysis reactor and as described above, accelerates the rate of volatile organics hydrolysis as well as the mineralization (and thus dewaterability) of the inorganic solids. There may also be intrinsic properties of the organic acids that further enhances the effectiveness of the thermal hydrolysis. Furthermore, additional organic acids can be added to the feed stock to further optimize thermal hydrolysis and dewaterability.

Figure 3:
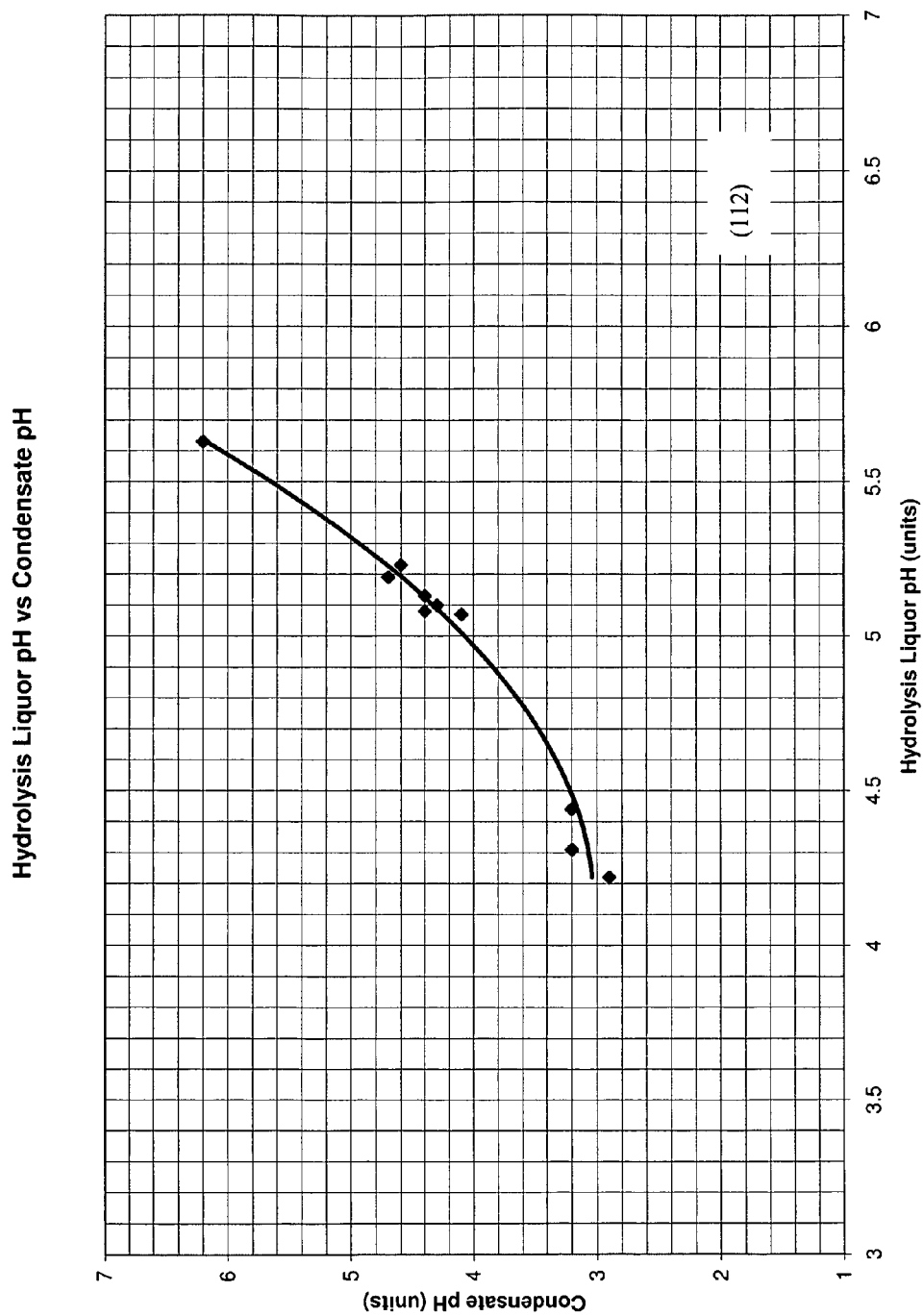
FIG. 3 is a graph of the relationship of Condensate pH to Hydrolysis Liquor pH.

The improvements to prior art hydrolysis methods and apparatus described herein may be implemented within the context of known hydrolysis systems. FIG. 3 illustrates one embodiment of a prior art apparatus for thermal hydrolysis and anaerobic treatment of particulate biodegradable organic waste 10, which is suitable for the implementation of the improvements disclosed herein. A particle sizer 12, which may be a shredder or grinder, receives particulate biodegradable organic waste to be treated and sizes the waste to a particle size of between ¼"-2". The particle sizer may be any suitable device for producing the desired sized particles known to the art. A feed blend tank 14 receives the sized particulate biodegradable organic waste from the particle sizer 12. The feed blend tank 14 may also be used to settle and separate higher specific gravity materials. The feed blend tank 14 may include a suitable agitator for mixing the particulate biodegradable organic waste.

A first liquid/solid separator 16 receives the particulate biodegradable organic waste from the feed blend tank 14 and separates liquid from the particulate organic waste. The first liquid/solid separator 16 may be a screw press, centrifuge or any other liquid/solid separator known to the art. A thermal hydrolysis reactor 18 receives the dewatered particulate biodegradable organic material for the purpose of solubilizing the particulate organics. In the apparatus illustrated in FIG. 4, a pre-steaming bin 20 first receives the dewatered particulate biodegradable organic waste and steam from a steam source 22 is introduced to the pre-steaming bin to preheat the particulate biodegradable organic waste. From the pre-steaming bin 20 the material moves to the steam hydrolysis reactor 18. There, additional steam from the steam source 22 is added and thermal hydrolysis is performed at a temperature of about 130° C. and preferably at least about 170° C., and at or above the saturated water vapor pressure to produce a slurry including solubilized organic material and unhydrolyzed residual solids. The temperature range may be from about 130°-225° C. and the pressure may range from 46.1 psig to 370 psig. The hydrolysis is performed at a temperature, pressure and period of time which maximizes the amount of particulate biodegradable organic waste that is solubilized while optimizing the dewatering properties of residual solids and minimizing the production of ammonia and soluble organic compounds recalcitrant to biodegradation. Thus, there can be some variation in the given temperature and pressure ranges provided the goal of maximizing one or more of these objectives is met. In some instances use of indirect heating, for example by hot oil or electricity may be used in place of direct heating by injection of steam into the hydrolysis reactor. The solubilized organic material and residual solids flow to the steam flash tank 24 where pressure is reduced. In known hydrolysis apparatus, steam can be recovered from the flash tank 24 for use to heat the pre-steaming bin 20 using condensers through conduit 26. The improvements to known hydrolysis methods described in detail below include additional use of the steam or condensate collected from the flash tank 24.

A chemical supply 28 may be provided to provide chemicals to the particulate organic waste prior to thermal hydrolysis to both promote hydrolysis and dewatering of the residual solids. Preferred chemicals may be either an acid or a base. Acids that can be used include, but are not limited to, HCl, HNO3, sulfites, bisulfites and sulfates such as H2SO4 and organic acids such as formic or acetic acid. Bases that may be used may include any water soluble hydroxide including, but not limited to, NaOH, KOH, Ca(OH)2 and Mg(OH)2. Specifically, KOH in small quantities has been observed to enhance thermal hydrolysis.

The thermal hydrolysis reactor 18 described above is a continuous feed reactor. Alternatively, and not illustrated, a batch type hydrolysis process may be used. In such a process, a feed bin replaces the presteaming bin 20 and the pre-steaming and hydrolysis functions are all accomplished in a single batch reactor in which the pH, temperature, pressure and residence time conditions are maintained as needed to provide the desired level of organic particulate matter solubilization.

Solubilized organics and residual solids flow to a second liquid/solid separator 30. As with the first liquid/solid separator 16, the second liquid/solid separator 30 may be any known separator such as a screw press or high solids centrifuge. The liquid/solid separator chosen will depend upon the residual particulate properties and the need to mitigate any odor concerns. If removal of salt or other water soluble contaminants from the residual solids is desired, washing/elutriation may be incorporated into the liquid/solid separation step. The dewatered residual solids are then delivered to a solids receiving tank 31 from where they can be subjected to composting and used as a soil amendment or fertilizer.

Liquids from the second liquid/solid separator 30 are recycled via conduit 32 to the feed blend tank 14 for exchange of residual heat in the solubilized liquids from the hydrolysis reaction with the particulate biodegradable organic waste. This heat exchange may be accomplished with any known heat exchange device that keeps the material flows separate. Alternatively, the solubilized liquids are mixed with the particulate biodegradable organic waste to effect the heat exchange. Thereafter, as described above, liquids, including the solubilized organics are separated from the particulate biodegradable organic waste by the first liquid/solid separator 16. The separated liquids flow through conduit 34 to an anaerobic reactor 36. If necessary or desired, dilution water from a source 38 may be added to the anaerobic reactor 36. The dilution water may be a secondary wastewater treatment plant effluent or any other suitable source of dilution water. Methane rich gas may be captured from the anaerobic reactor and used for energy recovery. Treated effluent from the anaerobic reactor may be disposed in any suitable manner, including delivery to a conventional wastewater treatment plant. The liquid for anaerobic treatment may require disposal in a conventional wastewater treatment plant. As a condition to discharge to the receiving environment, limitation may be placed on the quantity or concentration of total oxygen demand of the residual organic component of the effluent, including non-degradable soluble organic compounds (measured as chemical oxygen demand (COD), total oxygen demand (TOC), or other analytical measure of residual organic material and ammonia. Therefore, it may be important to operate the thermal processes in such a manner as to minimize the formation of soluble organic compounds recalcitrant to biodegradation as well as ammonia. Finally, biosolids recovered from the anaerobic reactor 36 may be combined with the dewatered residual solids in the solids receiving tank 31 for composting, combustion to produce energy, or other disposal.

Both mesophilic and thermophilic anaerobic processes may have application to hydrolysis system. Anaerobic processes operating in the mesophilic temperature range may be able to achieve higher degrees of methanization and process stability than those operating in the thermophilic temperature range. Several known process configurations, including but not limited to anaerobic contact, anaerobic filter, anaerobic fluid bed, upflow anaerobic sludge blanket (UASB), anaerobic membrane bioreactors, and hybrids of these anaerobic configurations, can be used with hydrolysis apparatus for the treatment of the hydrolysis liquor. Of these, the UASB configuration, particularly the ultra-high rate reactors developed and licensed by several suppliers that are capable of operating at inorganic loading in the range of 20 to 35 kg COD/m3/day are likely to be the most functional and cost effective. Representative suppliers and their models include: Biothane Corporation's Biobed™ and Paques BV's Internal Circulation Upflow Anaerobic Sludge Blanket Reactor (IC-UASB). Considering the concentration of the dissolved organics and probable ammonia concentration of the hydrolysis liquor, dilution will be required before anaerobic treatment. As discussed above, in lieu of fresh water, wastewater secondary treatment effluent would be an acceptable and economical source of dilution water.

Figure 4:
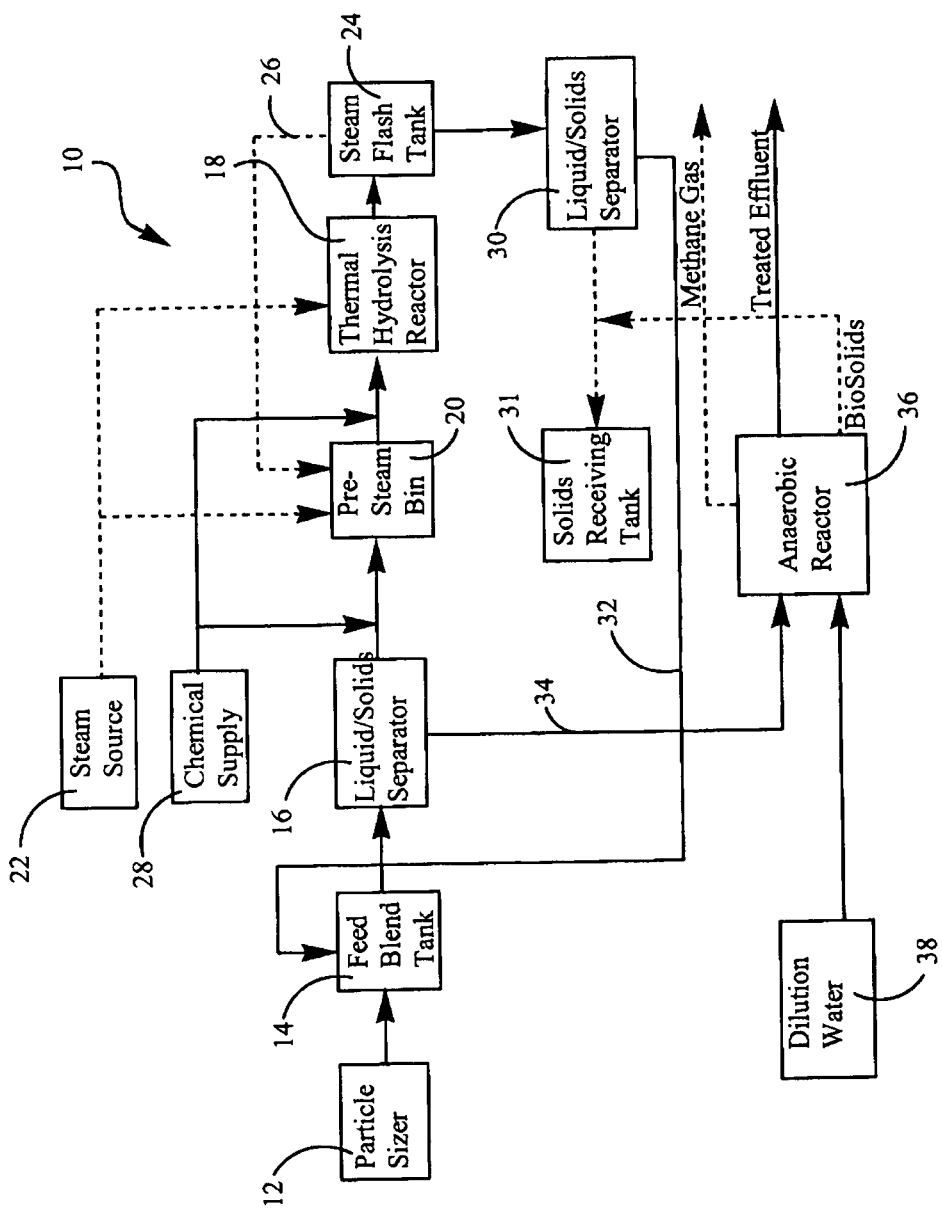
FIG. 4 is a schematic block diagram of a prior art hydrolysis apparatus.

As described above, a significant fraction of the organic acids in the product from thermal hydrolysis is contained in the condensate formed when pressure is rapidly released during flashing of hydrolysis product in the flash tank 24 (FIG. 4). The methods and apparatus disclosed herein include recycling the condensate to exploit the organic acids contained therein. As noted above, the pH of condensate from the flash tank is typically 0.5 to >1.2 units more acidic than the feed liquor (FIG. 3). In particular, as shown in the schematic diagram of FIG. 5, a hydrolysis system such as that generally described above with respect to FIG. 4 may be improved by blending recycled condensate with the feed to the hydrolysis reactor. Condensate recycling will increase the organic acid content of the feedstock, lower the pH in the hydrolysis reactor, and accelerate the rate of volatile organics hydrolysis, as well as increase the mineralization (and thus dewaterability) of the inorganic solids. The properties of the condensate which are believed to accelerate hydrolysis and mineralization include but are not limited to lowered pH plus other intrinsic properties of the organic acids.

Figure 5:
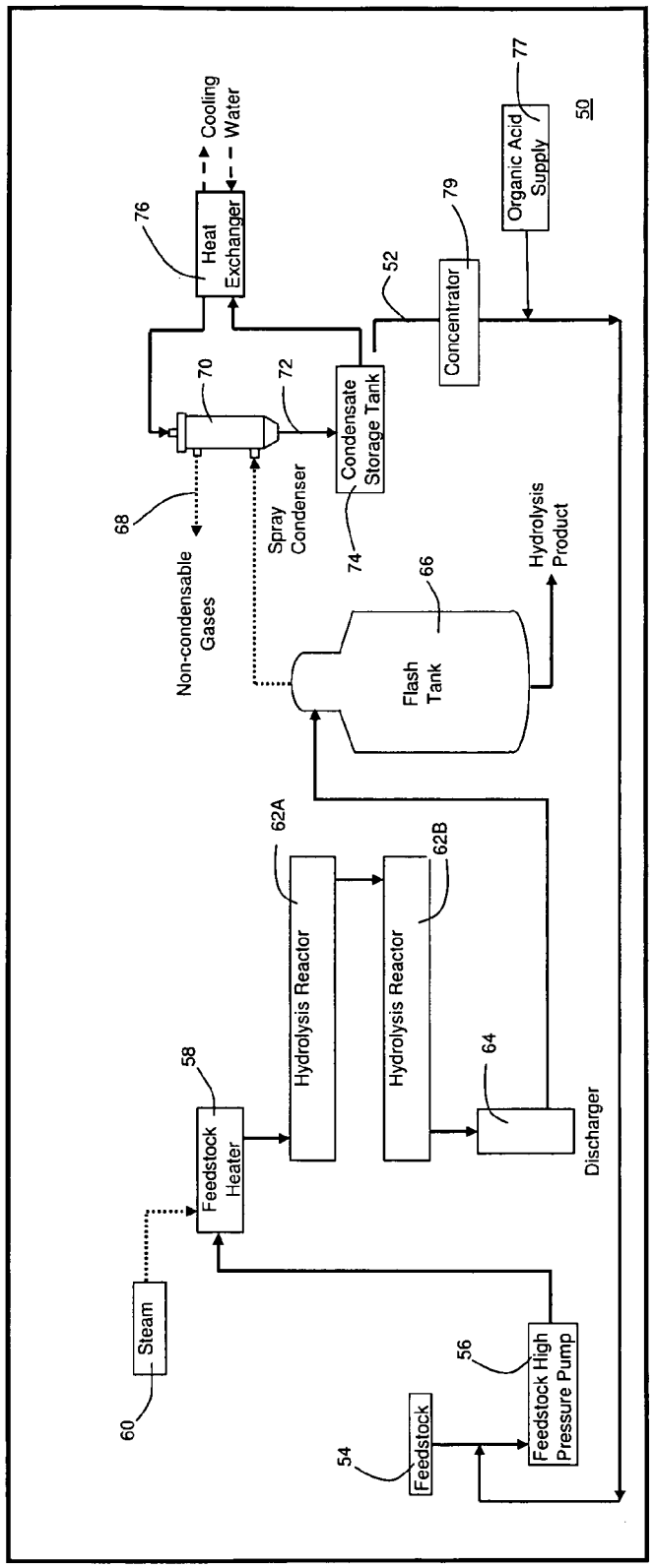
FIG. 5 is a schematic block diagram of a hydrolysis apparatus featuring condensate recycling and optional organic acid supplementation.

FIG. 5 is a schematic diagram of a thermal hydrolysis module 50 including condensate recycling in which recycled condensate 52 is combined with the feedstock 54 prior to thermal hydrolysis. Particulate organic feedstock is conveyed by a feedstock high pressure pump 56 to a feedstock heater 58 where the feedstock is heated to the operating temperature by direct steam injection 60 or indirect heat transfer (i.e. electrical, hot oil, or steam). Thermal hydrolysis and solubilization of particulate organic material occurs as the feedstock passes though one or more thermal hydrolysis reactors 62A,B and into the discharger vessel 64. The pressure release across the discharger valve causes some of the liquid to vaporize (flash). The vapor and hydrolysis product are separated in the flash tank 66. The vapor, consisting of water vapor containing a substantial fraction of the volatile acids discharged from the hydrolysis reactors 62A,B and non-condensable gases 68 are passed through a spray condenser 70. Water vapor containing organic acids 72 is condensed and collected in the condensate storage tank 74, while non-condensable gas 68 exits the top of spray condenser 70. Condensate is recirculated through a heat exchanger 76 and returned to the spray condenser as the condensing media. This recirculation of condensate through the spray condenser 70 concentrates the organic acids until an equilibrium condition is reached.

Combining recycled condensate 52 with the feedstock 54 prior to pumping to the feedstock heater 58 and one or more hydrolysis reactor 62A,B will increase the concentration of organic acids in the feedstock, reduce the pH in the hydrolysis reactor(s) 62A,B, and increase the rate of particulate organic matter hydrolysis (solubilization). An organic acid supply 77 may be provided in communication with the hydrolysis reactor 62A to supply an organic acid such as acetic acid or formic acid to further selectively lower the pH in the hydrolysis reactor as necessary or desired to optimize solids hydrolysis or improve dewatering of residual solids. These unique operating features are expected to improve the overall performance of the process and increase throughput capacity, by reducing the time-at-temperature required to achieve hydrolysis of a specific fraction of volatile particulate material at a specified temperature.

In another embodiment, a concentrator 79 can be provided in fluid communication with the condensate storage tank 74. The concentrator may be, by way of example, a distillation unit, steam stripping unit or molecular sieve. In such an embodiment the pH can be lowered and the volume of condensate recycled to the feedstock can be decreased. This would have the advantages of providing the same effective amount of acid to the feedstock in less volume of liquid, improving efficiency by decreasing the amount of liquid subsequently delivered to the hydrolysis reactor 62A. Use of the concentrator may also eliminate the need to add supplemental organic acid from the organic acid supply 77.

EXAMPLES

The following examples are provided for illustrative purposes only and are not intended to limit the scope of the invention.

Example 1

During preliminary thermal hydrolysis treatability tests of combined raw primary and secondary biosolids, two batch tests were conducted at operating conditions of 170° C. and time-at-temperature of 180 minutes. A small mount of condensate (878 gms) from the first test was added to 6049 gms of feed stock (approximately 12.5% by weight). The results shown on Table 3, on graph 106 of FIG. 2C and on graph 108 of FIG. 2D indicated that solubilization of volatile solids increased from 34.4 to 36.6% (an increase in the quantity of volatile solids solubilized of 5.5%). Screw press cake dryness increased from 59.0 to 61.4% (an overall increase in dryness of 4.1%). The BOD5 and COD and the condensate increased 22.7% and 36.8% respectively, indicating a cycling up of organics in the condensate with reuse. The drop in pH from 5.1 to 4.9 indicates that a significant portion of the increases organic content of the condensate as it is recycled is organic acids. A continuous thermal hydrolysis process in which all of the condensate is recycled to combine with the feedstock is expected to further accelerate volatile solids solubilization and improve residue dewaterability at constant operating temperature and time-at-temperature.

Example 2

In a second set of combined raw primary/secondary biosolids thermal hydrolysis treatability tests, the batch tests were operated at 170° C. with the time-at-temperature reduced from 120 minutes in the initial test in 30 minute increments for the 3 succeeding batch tests and 15 minutes for the final batch test. After the initial batch test, condensate from the previous batch test was combined with the feedstock. The condensate added to the feedstock represented between 13.4-16.8% of the total mass of material placed in the batch reactor.

Figure 2D:
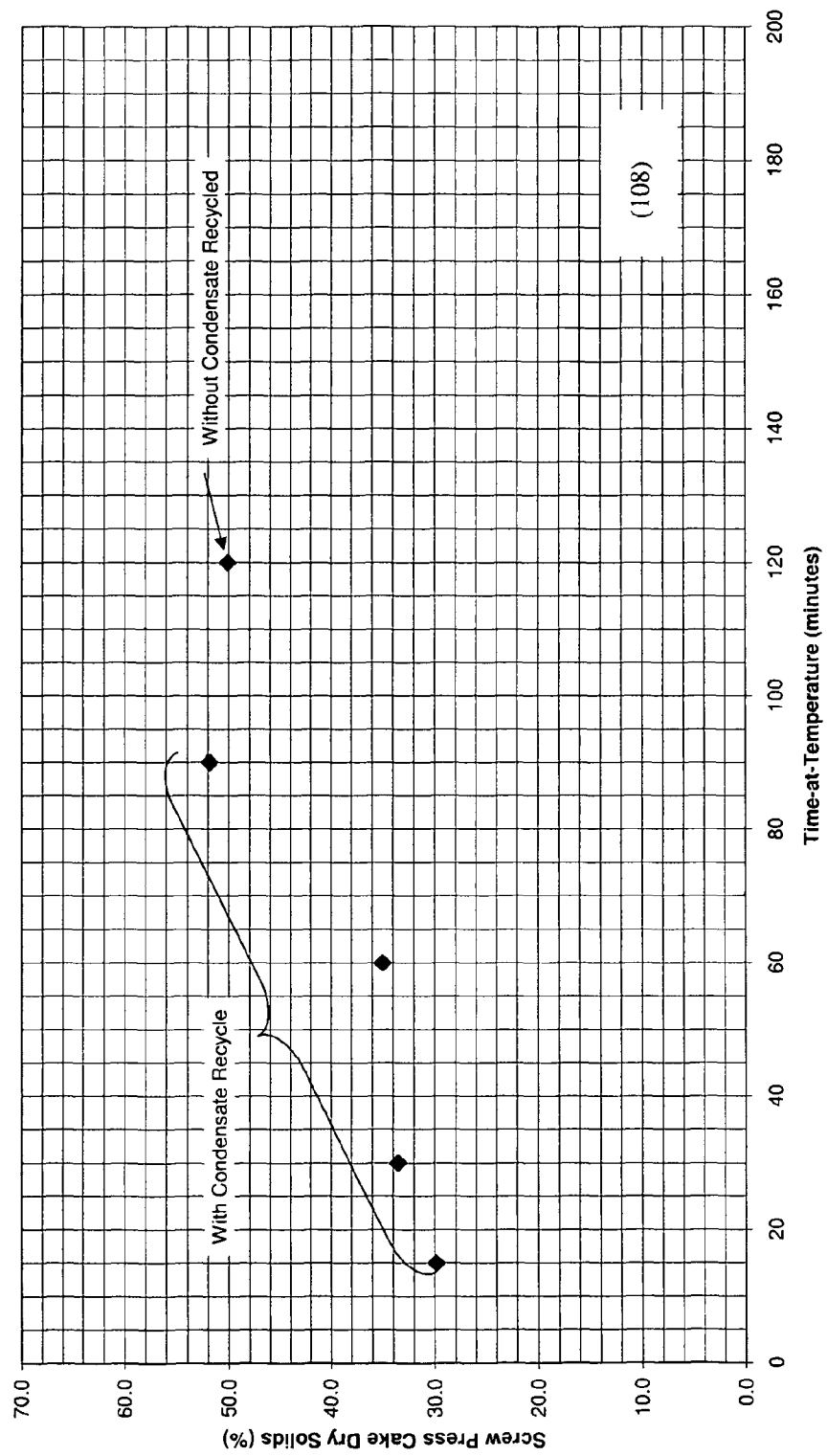
Figure 2E:
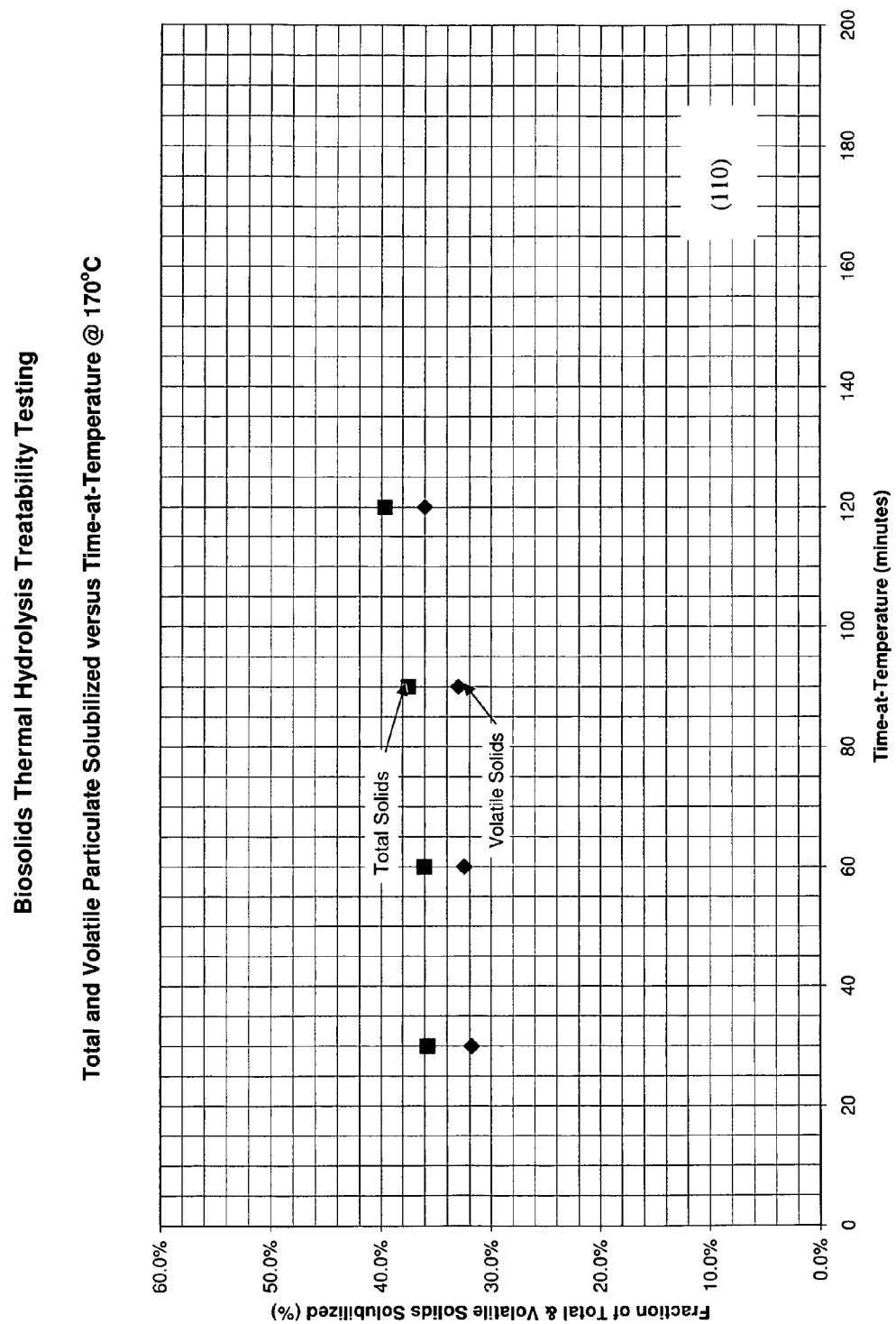

The results of the second set of 5 batch tests are shown on Table 4 and FIGS. 2D and 2E. Recycling condensate resulted in the dewaterability of the residue after 90 minutes time-at-temperature (51.9% screw press cake dryness) to be slightly better than the residue after 120 minutes time-at-temperature (50.1% screw press cake dryness) without condensate added. The residue from preliminary batch tests at 170° C. and 90 minutes time-at-temperature without condensate had an average screw press cake dryness of 43%. Comparing the preliminary and second treatability tests results at the sane test conditions, the net effect of condensate recycle was to increase the dewaterability of the residue by approximately 21%.

Example 3

In a third set of combined raw primary/secondary biosolids thermal hydrolysis treatability tests, a series of ten (10) batch tests were operated at 170° C. and three specific time-at-temperature conditions—120, 90, and 60 minutes—to further evaluate the effect of decreasing thermal hydrolysis pH operating conditions by condensate recycle, and in some instances including fortification with supplemental organic acid to improve residue dewaterability and volume reduction. As described on Table 5, all batch tests were charged with approximately 7300-7500 grams wet weight of combined raw primary/secondary biosolids from a domestic municipal wastewater treatment plant containing approximately 20 percent dry solids. Between 1124 and 1332 grams of water, condensate from a previous batch test, or condensate from a previous batch test fortified with supplemental acetic acid were added to each charge. Two batch test (Cooks 1A and 1B) were run for 120 minutes time-at-temperature, four batch tests (Cooks 2A, 2B, 2C and 2D) run for 90 minutes time-at-temperature, and four batch tests (Cooks 3A, 3B, 3C, and 3D) were run for 60 minutes time-at-temperature. Water was added to Cooks 1A, 1B, and 1C. Condensate from a previous batch test was added to Cooks 2B, 2C, and 3B. Condensate from a previous batch test was fortified with acetic acid at varying concentrations and added to Cooks 2D, 3C and 3D.

Figure 2F:
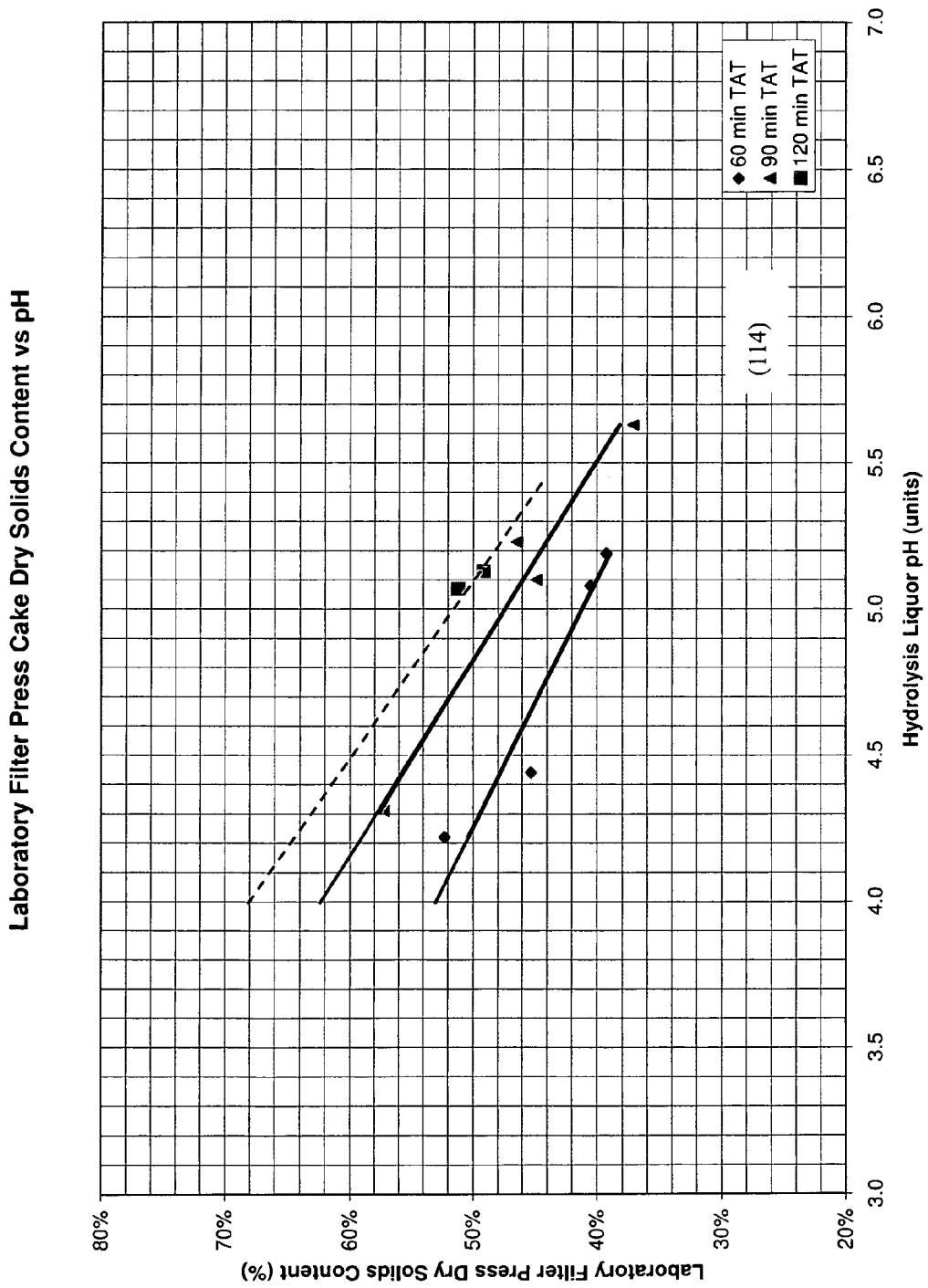
Figure 2G:
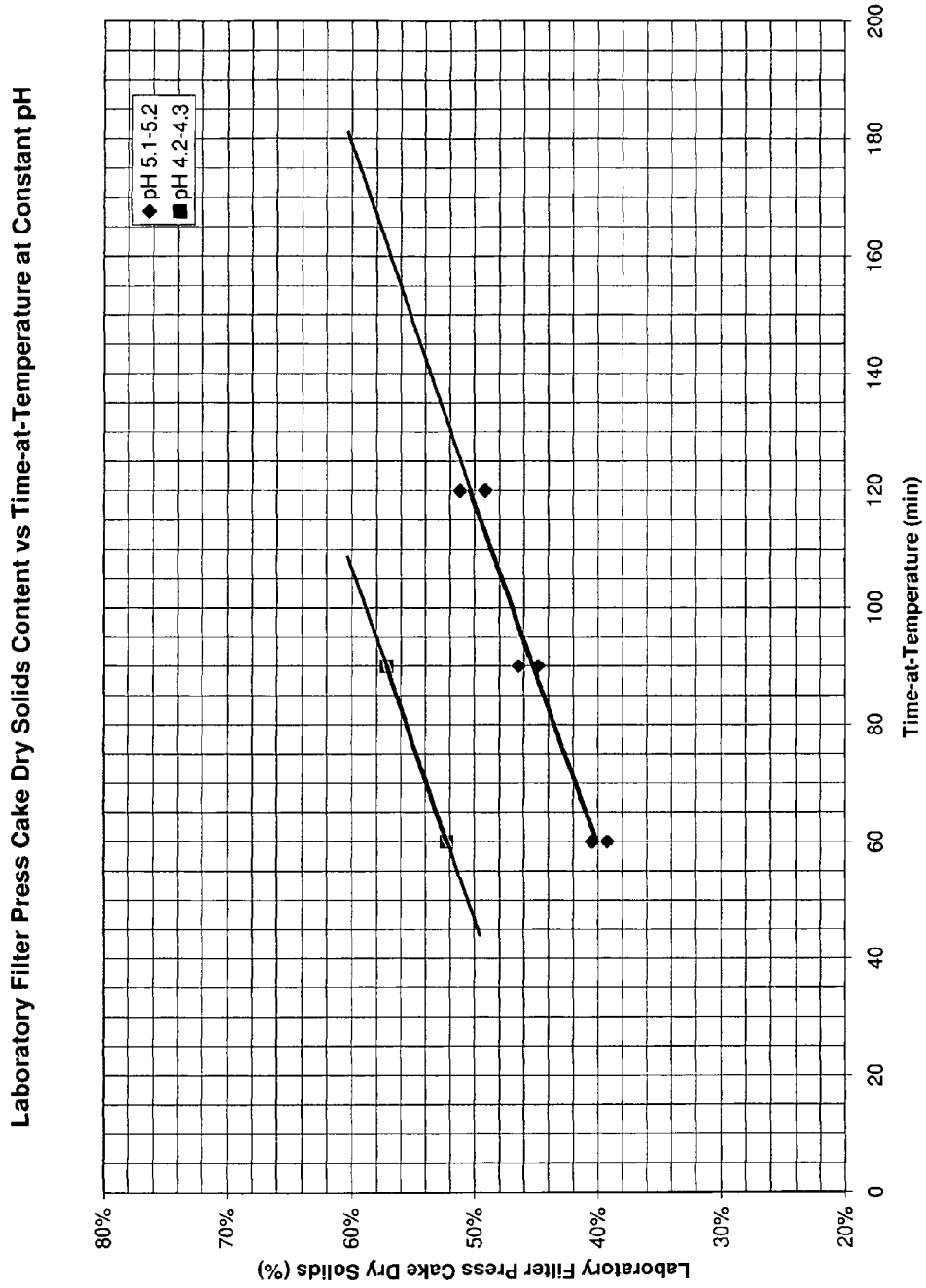

The results of the third set of batch tests are summarized on Table 5, Table 7 and FIGS. 2F, 2G and 3. The relationship of condensate pH to hydrolysis liquor pH is shown on Table 7 and FIG. 3. The pH of the hydrolysis liquor and condensate become increasingly more acidic as the concentrations of the organic acids increase. The data summarized on Table 5 and graphically shown on FIGS. 2F and 2G demonstrate significant improvement in the unhydrolyzed residue dewaterability with reduction in hydrolysis reactor pH, as a resulting of increased the organic acid content due to recycling condensate. Fortifying the recycled condensate with supplemental organic acid enhances performance by further lowering pH in the hydrolysis reactor.

The same level of hydrolysis performance can be achieved with a significant reduction in reactor volume by reducing the hydrolysis liquor pH. The plot of Filter Press Cake Dry Solid Content versus pH shown on FIG. 2F indicates that the same filter press cake solids content of approximately 50 percent can be achieve at a time-at-temperature of 120 minutes and hydrolysis liquor pH of 5.1, time-at-temperature of 90 minutes and hydrolysis liquor pH of 4.8, and time-at-temperature of 60 minutes and hydrolysis liquor pH of 4.1. Extrapolation from the Filter Press Cake Dry Solid Content versus Time-at-Temperature plots shown on FIG. 2G indicates that it would be necessary to nearly double the time-at-temperature from approximately 78 minutes and operating at a hydrolysis reactor pH approximately 4.2-4.3 to approximately 147 minutes and operating at a hydrolysis reactor pH approximately 5.1-5.2 to achieve a filter press cake dry solids content of approximately 55 percent.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

TABLE 1

Screw press dry solids content and particulate organics solubilization in relation to reactor time-at-temperature

| Time @ Temp. (min) | Temp (°C.) | Total Solids Solubilization | | | Volatile Solids Solubilization | | | Screw Press Dry Solids (%) | | |
|---|---|---|---|---|---|---|---|---|---|---|
| | | Low | High | Ave | Low | High | Ave | Low | High | Ave |
| 60  | 170 | 21.0% | 33.0% | 27.0% | 24.0% | 34.0% | 29.0% | 32% | 42% | 37.0% |
| 90  | 170 | 24.5% | 37.0% | 30.8% | 26.0% | 36.0% | 31.0% | 38% | 48% | 43.0% |
| 120 | 170 | 28.0% | 40.0% | 34.0% | 28.0% | 38.0% | 33.0% | 44% | 54% | 49.0% |
| 180 | 170 | 35.0% | 44.0% | 39.5% | 32.0% | 41.0% | 36.5% | 52% | 61% | 56.5% |
| 240 | 170 | 41.5% | 48.0% | 44.8% | 37.0% | 43.0% | 40.0% | 56% | 64% | 60.0% |

TABLE 2

Volatile solids solubilization and residual solids dewaterability as a function of reactor temperature

| | | | | |
|---|---|---|---|---|
| Time at Temperature | (minutes) | 90 | 90 | 90 |
| Temperature | (°C.) | 150 | 160 | 170 |
| Volatile Solids Solubilized | (%) | 11 | 23 | 34 |
| Screw Press Cake Dry Solids | (%) | 22 | 31 | 41 |

TABLE 3

Combined Raw Primary and Secondary Biosolids Treatability Tests

| | Operating Conditions | | | Feed | | | Condensate | | | | Particulate Organics Solubilized | |
|---|---|---|---|---|---|---|---|---|---|---|---|---|
| Cook No. | Temp. (°C.) | Time @ Temp. (min) | | Feed Batch No. | Pri/Sec Ratio | Liquor pH | pH | TCOD (mg/l) | TBOD5 (mg/l) | TBOD/TCOD (mg/mg) | Volatile Solids (%) | Total Solids (%) |
| 13 | 170 | 180 |     | 3 | 0.85 | 5.22 | 5.09 | 16,160 | 7,660  | 0.47 | 34.4 | 34.1 |
| 14 | 170 | 180 | (1) | 3 | 0.85 | 5.12 | 4.88 | 22,120 | 9,400  | 0.42 | 36.6 | 35.7 |
| 1  | 170 | 120 |     | 1 | 0.52 | 5.20 | 3.70 | 21,309 | 9,966  | 0.47 | 32.1 | 25.6 |
| 5  | 170 | 90  |     | 1 | 0.52 |      | 3.95 | 22,031 | 7,336  | 0.33 | 30.0 | 24.6 |
| 2  | 170 | 60  |     | 1 | 0.52 | 5.25 | 4.10 | 20,471 | 7,915  | 0.39 | 24.1 | 23   |
| 3  | 170 | 30  |     | 1 | 0.52 |      | 4.00 | 14,188 | 5,957  | 0.42 | 4.4  | 4.9  |
| 4  | 170 | 15  |     | 1 | 0.52 | 5.40 | 4.75 | 24,685 | 12,508 | 0.51 | 17.8 | 12.8 |

Note 1:
Condensate from Batch 13 added to Batch 14 feedstock

TABLE 4

Combined Raw Primary and Secondary Biosolids Treatability Tests

| Cook No. | Cook Time (min) | Cook Temp. (°C.) | Water or Concensate Added to Feedstock | (% tot. wt) | Screw Press Dry Solids (%) | Particulate Solubilized Total Solids (%) | Particulate Solubilized Volatile Solids (%) | Total Volume Reduction (%) | Liquor pH (units) | Condensate pH (units) | Condensate TCOD (mg/l) | Condensate TBOD5 (mg/l) | TBOD/TCOD (mg/mg) |
|---|---|---|---|---|---|---|---|---|---|---|---|---|---|
| 4 | 120 | 170 | Water(1)      | 14.9 | 50.1 | 36.0% | 39.7% | 73.1% | 4.7/5.2 | 4.2/4.6 | 30,300 | 19,250 | 0.64 |
| 5 | 90  | 170 | Condensate(2) | 14.9 | 51.9 | 33.0% | 37.5% | 69.2% | 4.4/4.9 | 3.7/4.2 | 27,600 | 17,800 | 0.64 |
| 6 | 60  | 170 | Condensate(2) | 16.4 | 35.0 | 32.5% | 36.0% | 60.8% | 4.5/5.0 | 3.8/4.4 | 31,600 | 21,000 | 0.66 |

TABLE 4-continued

Combined Raw Primary and Secondary Biosolids Treatability Tests

| Cook No. | Cook Time (min) | Cook Temp. (° C.) | Water or Concensate Added to Feedstock | (% tot. wt) | Screw Press Dry Solids (%) | Particulate Solubilized Total Solids (%) | Particulate Solubilized Volatile Solids (%) | Total Volume Reduction (%) | Liquor pH (units) | Condensate pH (units) | Condensate TCOD (mg/l) | Condensate TBOD5 (mg/l) | TBOD/TCOD (mg/mg) |
|---|---|---|---|---|---|---|---|---|---|---|---|---|---|
| 7 | 30 | 170 | Condensate[2] | 16.8 | 33.5 | 31.8% | 35.8% | 54.6% | 4.6/5.1 | 3.8/4.3 | 32,900 | 21,400 | 0.65 |
| 8 | 15 | 170 | Condensate[2] | 13.4 | 29.9 | | | | 5.0/5.5 | 4.4/4.9 | 37,550 | 23,200 | 0.62 |

Notes:
[1]Water added to feedstock
[2]Condensate from previous cook added to feedstock

TABLE 5

Combine Raw Primary and Secondary Biosolids Treatability Test Conditions

| Cook No. | Cook TAT[1] (min) | Cook Temp (° C.) | Biosolids Wet wt. (gms) | Biosolids Dry wt (%) | Water or Condensate Added to Feedstock | (gms) | (Tot. wt. %) | Screw Press Dry Solids (%) | Liquor pH (units) | Condensate pH (units) |
|---|---|---|---|---|---|---|---|---|---|---|
| 1A | 120 | 170 | 7500 | 20.3% | Water | 1300 | 14.8% | 49.2% | 5.1 | 4.4 |
| 1B | 120 | 170 | 7500 | 20.0% | 1A Condensate | 1205 | 13.8% | 51.2% | 5.1 | 4.1 |
| 2A | 90 | 170 | 7500 | 20.2% | Water | 1300 | 14.8% | 44.9% | 5.1 | 4.3 |
| 2B | 90 | 170 | 7500 | 19.6% | 1B Condensate | 1124 | 13.0% | 37.1% | 5.6 | 6.2 |
| 2C | 90 | 170 | 7500 | 19.6% | 2A Condensate | 1177 | 13.6% | 46.5% | 5.2 | 4.6 |
| 2D | 90 | 170 | 7500 | 20.3% | 3A Cond. w/15% HAc | 1300 | 14.8% | 57.2% | 4.3 | 3.2 |
| 3A | 60 | 170 | 7500 | 20.0% | Water | 1300 | 14.8% | 39.3% | 5.2 | 4.7 |
| 3B | 90 | 170 | 7500 | 19.7% | 2C Condensate | 1314 | 14.9% | 40.5% | 5.1 | 4.4 |
| 3C | 90 | 170 | 7500 | 20.6% | 3B Cond. w/15% HAc | 1300 | 14.8% | 52.3% | 4.2 | 2.9 |
| 3D | 90 | 170 | 7314 | 20.5% | 3C Cond. w/10% HAc | 1332 | 15.4% | 45.3% | 4.4 | 3.2 |

Note 1:
Time-at-temperature

TABLE 6

Reactor condensate composition

| Cook No. | Time-at-Temp. (min) | pH (Units) | Formic (mg/l) | Acetic (mg/l) | Butyric (mg/l) | Propionic (mg/l) | Pyruvic (mg/l) | TCOD (mg/l) | TBOD5 (mg/l) |
|---|---|---|---|---|---|---|---|---|---|
| 4 | 120 | 4.6 | 390 | 2,720 | 1,320 | 4,630 | 180 | 30,300 | 19,250 |
| 5 | 90 | 4.2 | 71.8 | 3,350 | 594 | 2,520 | 413 | 27,600 | 17,800 |
| 6 | 60 | 4.4 | ND | 2,200 | 351 | 1,680 | ND | 31,600 | 21,000 |
| 7 | 30 | 4.3 | ND | 2,280 | 312 | 1,820 | 58.4 | 32,900 | 21,400 |
| 8 | 15 | 4.9 | ND | 1,880 | 694 | 2,070 | 53.4 | 37,550 | 23,200 |

TABLE 7

Reactor Hydrolysis Liquor and Condensate Characterization

Hydrolysis Liquor

| Cook No. | TAT[1] (min) | pH | TCOD (mg/l) | TBOD5 (mg/l) | Organic Acids Formic (mg/l) | Acetic (mg/l) | Butyric (mg/l) | Propionic (mg/l) | Pyruvic (mg/l) |
|---|---|---|---|---|---|---|---|---|---|
| 1A | 120 | 5.1 | 108,000 | 54,100 | | | | | 155 |
| 1B | 120 | 5.1 | 107,000 | 37,000 | 677 | 3880 | 422 | 2270 | 143 |

TABLE 7-continued

Reactor Hydrolysis Liquor and Condensate Characterization

| Cook No. | Time[1] | pH | TCOD (mg/l) | TBOD5 (mg/l) | Formic (mg/l) | Acetic (mg/l) | Butyric (mg/l) | Propionic (mg/l) | Pyruvic (mg/l) |
|---|---|---|---|---|---|---|---|---|---|
| 2A | 90 | 5.1 | 102,000 | 33,900 | 606 | 3920 | 508 | 2220 | 138 |
| 2B | 90 | 5.6 | 121,000 | 37,300 | 66 | 3140 | 66.2 | 1500 | 73.9 |
| 2C | 90 | 5.2 | 170,000 | 40,800 | 140 | 4140 | 633 | 2560 | 181 |
| 2D | 90 | 4.3 | 155,000 | 57,200 | | | | | |
| 3A | 60 | 5.2 | 109,000 | 37,500 | 127 | 3620 | 536 | 2290 | 178 |
| 3B | 90 | 5.1 | 119,000 | 38,400 | 549 | 4240 | 695 | 2680 | 220 |
| 3C | 90 | 4.2 | 139,000 | 60,400 | | | | | |
| 3D | 90 | 4.4 | 128,000 | 53,700 | | | | | |

| | | | | Condensate | | | | | |
|---|---|---|---|---|---|---|---|---|---|
| | | | | | | Organic Acids | | | |
| Cook No. | | pH | TCOD (mg/l) | TBOD5 (mg/l) | Formic (mg/l) | Acetic (mg/l) | Butyric (mg/l) | Propionic (mg/l) | Pyruvic (mg/l) |
| 1A | | 4.4 | 15,700 | 11,800 | 52.9 | 2,450 | 903 | 2,580 | 48.2 |
| 1B | | 4.1 | 22,800 | 9,390 | 66.1 | 2,540 | 936 | 2,660 | 82.4 |
| 2A | | 4.3 | 18,800 | 10,900 | 70.7 | 2,710 | 1,000 | 2,710 | 60.7 |
| 2B | | 6.2 | 23,600 | 12,100 | 51.5 | 1,990 | 730 | 2,030 | 93.6 |
| 2C | | 4.6 | 23,700 | 11,600 | 55.3 | 2,580 | 1,080 | 2,780 | 95.0 |
| 2D | | 3.2 | 40,000 | 24,700 | | | | | |
| 3A | | 4.7 | 16,700 | 8,800 | 42.7 | 2,500 | 1,030 | 2,730 | 98.3 |
| 3B | | 4.4 | 28,200 | 17,000 | 60.3 | 2,660 | 1,220 | 2,920 | 70.4 |
| 3C | | 2.9 | 56,000 | 31,800 | | | | | |
| 3D | | 3.2 | 47,000 | 25,300 | | | | | |

Note 1:
Time-at-temperature

Then invention claimed is:

1. A method of treating particulate biodegradable organic waste comprising:
   a) subjecting a particulate biodegradable organic waste to thermal hydrolysis at a temperature above about 130° C. and a pressure at about or above the saturated water vapor pressure to produce a slurry including solubilized organic material and residual solids;
   b) decreasing the pressure at which the slurry is maintained;
   c) capturing vapor containing organic acids released when the pressure is decreased;
   d) condensing the vapor containing the organic acids into a condensate containing the organic acids;
   e) concentrating the organic acids in the condensate; and
   f) adding at least a portion of the concentrated organic acids to particulate biodegradable organic waste to be subjected to the thermal hydrolysis of step a) to selectively lower the pH of the particulate biodegradable waste.

2. The method of claim 1 wherein the condensing step d) is accomplished using a spray condenser and the method further comprises prior to step f), spraying recovered condensate as the condensing medium in the spray condenser.

3. The method of claim 2 further comprising cooling the recovered condensate by heat exchange prior to spraying the recovered condensate in the spray condenser.

4. The method of claim 3 further comprising repeatedly recycling the recovered condensate through the heat exchanger and spray condenser to concentrate organic acid in the condensate.

5. The method of claim 1 wherein in step f) the pH is lowered to less than 5.1.

6. The method of claim 1 wherein the concentrating step is performed by one or more of distilling the condensate, steam stripping the condensate or processing the condensate with a molecular sieve.

7. The method of claim 1 further comprising:
   selectively adjusting the pH of the biodegradable organic waste as necessary to provide the biodegradable organic waste with an acidic pH;
   subjecting the particulate biodegradable organic waste with the acidic pH to the thermal hydrolysis of step a); and
   the adjustment of the pH of the biodegradable organic waste is accomplished at least in part by the adding of the at least a portion of the concentrated organic acids to the biodegradable organic waste.

8. The method of claim 7 wherein the pH is adjusted to less than 5.6.

9. The method of claim 7 wherein the pH is adjusted to less than 4.4.

* * * * *